United States Patent [19]
Lawlor et al.

[11] Patent Number: 5,355,491
[45] Date of Patent: Oct. 11, 1994

[54] COMPILER INCLUDING RETARGETABLE DATA GENERATION

[75] Inventors: Francis D. Lawlor, Saugerties; Thomas M. Spence, Hyde Park, both of N.Y.

[73] Assignee: International Business Machines Corporation, Armonk, N.Y.

[21] Appl. No.: 714,466

[22] Filed: Jun. 13, 1991

Related U.S. Application Data

[63] Continuation of Ser. No. 193,155, May 5, 1988, abandoned, which is a continuation of Ser. No. 788,318, Oct. 17, 1985, abandoned.

[51] Int. Cl.$^5$ .............................................. G06F 9/45
[52] U.S. Cl. ..................................... 395/700; 395/500; 364/DIG. 2; 364/973
[58] Field of Search ................. 364/200, 900, DIG. 1, 364/DIG. 2; 395/700, 500

[56] References Cited

U.S. PATENT DOCUMENTS

| | | | |
|---|---|---|---|
| 4,558,413 | 12/1985 | Schmidt et al. | 364/300 |
| 4,667,290 | 5/1987 | Goss et al. | 364/300 |
| 4,680,705 | 7/1987 | Shu | 364/300 |
| 4,713,775 | 12/1987 | Scott et al. | 364/513 |
| 4,858,114 | 8/1989 | Heath et al. | 364/200 |
| 4,961,133 | 10/1990 | Talati et al. | 364/200 |

OTHER PUBLICATIONS

"Compilers Are Cut Loose From Hardware Dependency", by Lowell Wolf, Craig Franklin, Kin-Man Chung—Electronics International, vol. 56, Dec. 1983.
Lewis et al., *Compiler Design Theory*, 1976, pp. 2–5.
Pyster, *Compiler Design and Construction*, 1980, pp. 10–23.
Barrett et al., *Compiler Construction Theory and Practice*, 1979, pp. 7–13.

*Primary Examiner*—Gareth D. Shaw
*Assistant Examiner*—Kakali Chaki
*Attorney, Agent, or Firm*—William A. Kinnaman, Jr.; Mark S. Walker

[57] ABSTRACT

A retargetable data generation method for a compiler program which may be executed on a general purpose information handling system such as an IBM System 370 includes the following steps, ordering the data according to a storage class, mapping the ordered data into sections in accordance with established criteria, ordering the sections into a number of parcels in accordance with one or more data attributes, determining format for an item in a parcel, and formatting each such item in each such parcel according to the determined format.

8 Claims, 3 Drawing Sheets

COMPILER INCLUDING RETARGETABLE DATA GENERATION

This is a continuation of application Ser. No. 07/193,155, filed May 5, 1988, now abandoned, which was in turn a continuation of application Ser. No. 06/788,318, filed Oct. 17, 1985, now abandoned.

BACKGROUND OF THE INVENTION

1. Field of the Invention

The present invention relates to methods for controlling Information Handling Systems and more particularly to methods for adapting compiler programs to different Information Handling Systems.

2. Description of the Prior Art

Retargetable Compilers

Most compilers are designed to take as input programs written in one specific language (e.g., FORTRAN, PASCAL, COBOL) and generate code for one specific target machine (e.g., IBM System 370). To generate code for a different target machine a significant portion of the compiler needed to be rewritten in order to build a compiler for the new target machine. The goal of a retargetable compiler is to make the building of a compiler for a new target machine a much simpler task.

The primary outputs of a compiler program are program code and data. The functions within the compiler to provide these outputs are generally referred to as code generation and data generation. The present invention relates to a retargetable data generation function in a retargetable compiler program.

The following are systems representative of the prior art.

The following publications relate generally to retargetable compilers but focus on the code generation function of compilers rather than data generation.

"A Machine Independent Algorithm for Code Generation and Its Use in Retargetable Compilers", by R. S. Glanville, Ph.D. Dissertation, Departments of Electrical Energy and Computer Science, University of California at Berkley, December, 1977, includes a detailed description of a design of a retargetable compiler which incorporates a retargetable code generator.

Although the dissertation discusses many aspects of retargetable compilation, it does not deal with the function of retargetable data generation according to the present invention.

"A New Method for Compiler Code Generation", by R. S. Glanville and S. L. Graham, Fifth ACM Symposium on Principles of Programming Languages, January, 1978 at pages 231–240, also deals with the retargetable code generation function in a retargetable compiler. The paper relates generally to a table driven code generator in which the compiler may be retargeted to any number of processing systems by replacing the table.

As above, although the paper relates generally to retargetable compilers, the paper does not address the problem of retargetable data generation in accordance with the present invention.

"Retargetable Compiler Code Generation", by Ganapathi, Fischer and Hennessy, ACM Computing Surveys, Volume 14, Number 4, December, 1982, as above relates generally to the problem of retargetable code generation techniques for retargetable compilers.

However, the paper does not address the problem of retargetable data generation which is the subject matter of the present invention.

The following U.S. patents are cited for completeness. Although the patents relate generally to compiler programs, none of the patents cited below teaches nor suggests a retargetable data generation method in accordance with the present invention. il. 5 U.S. Pat. 3,593,313 for Calculator Apparatus by Tomaszewski, et. al.; U.S. Pat. 3,828,322 for Electronic Computers to DeSandre, et. al.; U.S. Pat. 3,930,232 for Format Insensitive Digital Computer to Wallach, et. al.; U.S. Pat. 4,126,897 for Request Forwarding Systems to Capowski, et. al.; U.S. Pat. 4,342,081 for Tape Device Adapter to Dubuc; U.S. Pat. 4,417,322 for Report Generation Control System for Text Processing Machines to Berry, et. al.; U.S. Pat. 4,433,377 for Data Processing with Format Varying to Eustis, et. al.; U.S. Pat. 4,435,758 for Method for Conditional Branch Execution in SIMD Vector Processors, to Lorie, et. al.; and U.S. Pat. 4,437,184 for Method of Testing a Data Communications System to Cork, et. al.

SUMMARY OF THE INVENTION

Therefore, it is a primary object of the present invention to generate retargetable data in a compiler program for an information handling system including the steps of ordering the data according to a storage class, mapping the ordered data into sections in accordance with established criteria, ordering the sections into a number of parcels in accordance with one or more data attributes, determining format for an item in a parcel, and formatting each such item in each such parcel according to the determined format.

It is a further object of the present invention to map retargeted data in accordance with a parcel value assigned to the data.

It is yet another object of the present invention to generate retargetable data for a compiler program further including a generation of a number of tables which are used in various phases of compiler operation to construct desired retargeted output data.

Accordingly, a retargetable data generation method for a compiler program which may be executed on a general purpose information handling system such as an IBM System 370 includes the following steps: ordering the data according to a storage class, mapping the ordered data into sections in accordance with established criteria, ordering the sections into a number of parcels in accordance with one or more data attributes, determining format for an item in a parcel, and formatting each such item in each such parcel according to the determined format.

The foregoing and other objects, features and advantages of the invention will be apparent from the more particular description of the preferred embodiments of the invention, as illustrated in the accompanying drawing.

BRIEF DESCRIPTION OF THE DRAWING

In the drawing, like elements are designated with similar reference numbers, and identical elements in different specific embodiments are designated by identical reference numbers.

DESCRIPTION OF A PREFERRED EMBODIMENT OF THE INVENTION

Introduction

Compiler programs and the construction thereof are well known to those skilled in the art. Normally, a compiler is designed to improve the efficiency of execution of an application program written in a specific high-level programming language. To enhance the value of applications programs and make them migratable from one system to another, a compiler is required which can compile the application program into assembler code which can execute on different computing systems.

A compiler according to the present invention can be "retargeted" to produce machine-specific code for any machine whose characteristics have been described to the compiler.

The primary outputs of a compiler are code and data. The jobs to do this are generally referred to as code generation and data generation. Within data generation, some of the functions which must be performed are the ordering of data according to "storage class" (e.g., static data, automatic data, based data, etc), the selection of which items known to the compiler are actually to be generated, the form in which they are to be generated, and any desired ordering of items within the storage class. Frequently, too, it is necessary to precede and follow data within a storage class with special controls or information (e.g., assembler controls, linkage editor controls, boundary alignment information, etc.).

These problems have been solved in the past mostly by "hard coding" the data generation and sequencing the code to produce the correct ordering. Many thousands of lines of code were required.

COMPILER PHASES

Figure 1:
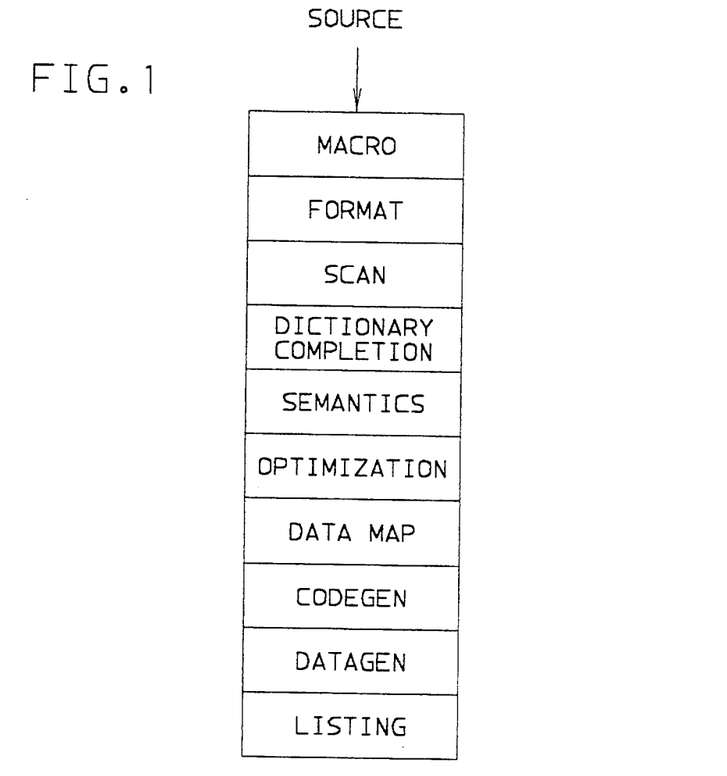
FIG. 1 is a diagram showing phases of compiler program operation.

Most compilers are constructed in terms of a number of "passes" over the source information, or "phases". Some simple compilers make only one pass over the source information while other, more complex ones, may make many passes. FIG. 1 shows types of compiler phases. The concept of compiler phases is generally described in Aho and Ullman "Principles of Compiler Design", Addison Wesley, 1979, at page 5, section 1.3.

To make the building of a compiler for a new target machine a simpler task requires rewriting the target-specific portions of the compiler so that they are table driven (by target-specific tables) or by replacing specific modules of code with target-specific modules. As a result, portions of the retargetable compiler are the same for all targets (Base Compiler Load Module) and portions are unique to each supported target machine (Target Dependent Load Module).

Figure 2:
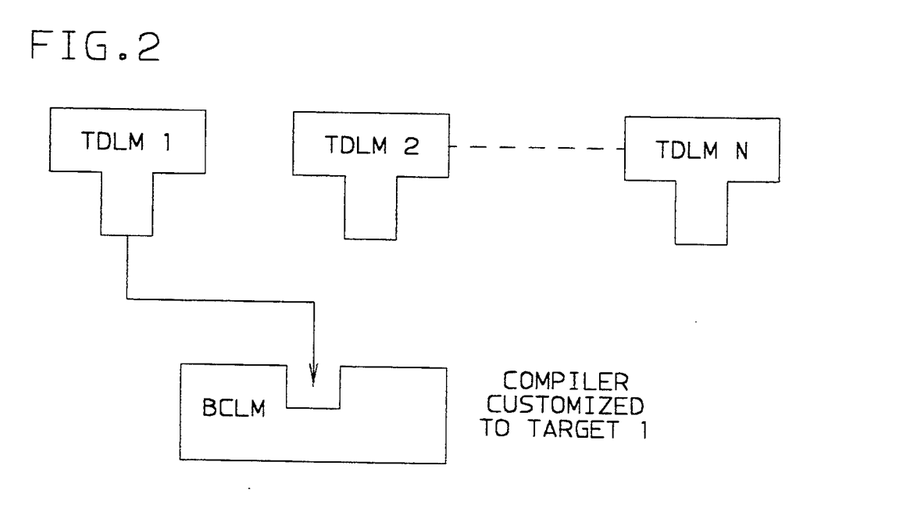
FIG. 2 is a block diagram of a retargetable compiler program showing the base compiler load modules and a number of target dependent load modules.

When the compiler is invoked, the BCLM determines the target machine which the user is interested in and loads the appropriate TDLM. This is shown in FIG. 2

Figure 3:
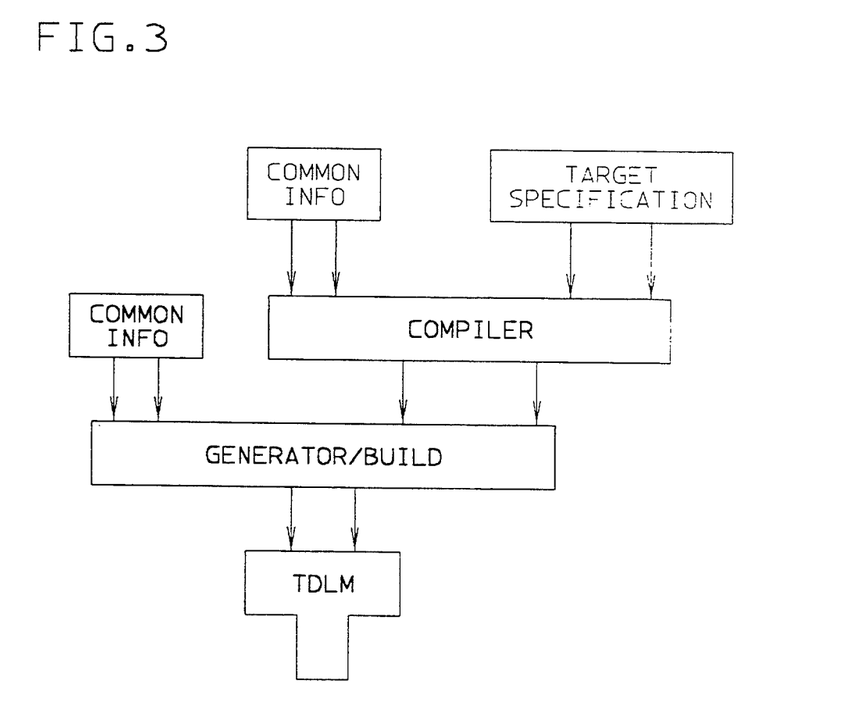
FIG. 3 is a flow chart diagram of the construction of a target dependent load module for a retargetable compiler program.

The TDLM for a specific target is constructed from target machine specifications by use of a standard compiler and a generator facility as shown in FIG. 3.

The target machine is defined using macro statements which were designed for ease of communicating information about the target machine characteristics. These macros are compiled in the usual manner to produce code and tables.

Some of the information is fed into a parser generator as described by Glanville and the resulting tables and code are used to build a TDLM load module.

The specification and processing of the Datagen portion will be shown in more detail below.

RETARGETABLE DATAGEN CONCEPTS

During the operation of the compiler, facilities are provided for the management of data. This includes data which was defined by the user via explicit and implicit source program declarations and data which is defined by the compiler during its operation, both by the BCLM and TDLM. Some of the data which is defined may need to be generated as output to the assembler following the operation of the compiler.

The Dictionary is the primary repository of information about data during the operation of the compiler. It holds information about constant values, variables, procedures, entry points, program labels, and items which may be output to the assembler (e.g., size of automatic data). Data generation is driven by dictionary entries and therefore all information not generated as "code" must be generated by placing appropriate entries in the dictionary. The ?DIDCL (declare) and ?DIREDCL (modify) macros are provided to simplify dictionary entry definition and modification by BCLM and TDLM authors.

Figure 4:
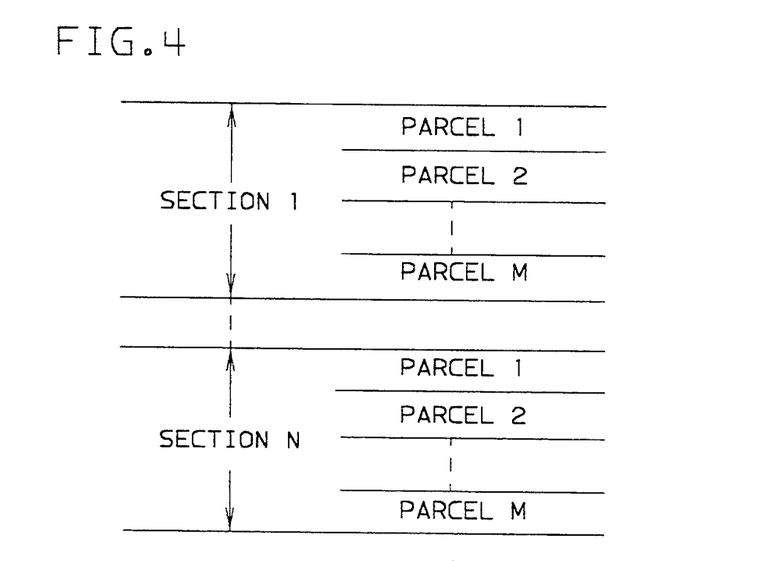
FIG. 4 is a diagram of the organization of data into sections and parcels in accordance with a preferred embodiment of the present invention.

To aid in the generation of data for the assembler, data is grouped logically into "Sections" and "Parcels" as shown in FIG. 4. Sections are generally used to group data together which share certain storage and addressability characteristics and which are generally generated together for the assembler. The grouping of data into the appropriate storage class (and therefore section) is controlled by the explicit or default storage class assigned when the item was declared. Certain section characteristics may be defined by the TDLM author by using the ?SECTION and ?SECTEND macros (below) .

Parcels are a grouping and ordering of data within a section. When Data Generation puts out data for a section it puts out dictionary entries in order according to their parcel number (1 thru 255). The allocation of dictionary items to parcel numbers is defined by the TDLM author using the ?PARCEL macros (below).

The Parcel definition macro provides a way for the TDLM author to define the ordering of data for the assembler. The parcel value may also be used to help select the output format for the assembler. Thus the use of the parcel value is also a tool for generating unique "card image" sequences for the assembler which might be required by a particular TDLM (e.g. CSECT, DSECT, boundary alignment, special names, etc). The parcel and section numbers can be used to precisely control the location and format of specific "card" types.

Parcels

The concept of parcels is used to help control the selection, ordering and formatting of data.

Data can be selected for Data Generation by placing it on the appropriate storage class chain and by giving it a non-zero parcel value. Data with a parcel value of zero will not be mapped by the Data Map phase and will not be Data Gen'd when processing a chain. This is a way to "hide" data from Data Generation. The BCLM does this for certain types of items which by default do not require any data generation (e.g., local labels and entry points). The TDLM may use parcel 0 for items which are used only during the compilation, for items which define constant strings for output formats, or for items which the TDLM author will handle in a special manner (e.g., imbedded parameter lists generated by codegen).

Non-zero parcel values are useful for ordering the data in a data section (e.g., static storage). Through the ?PARCEL macros the TDLM author can specify the criteria by which dictionary entries are given parcel values (thus controlling their order of generation). Thus data items can be ordered for output (e.g., all 4 byte arithmetics, all 2 byte arithmetics, and so on).

Parcel values can be assigned such that certain ones are reserved for special purposes (e.g. parcel 1 item causes generation of a an ¦DATA DSECT "card" ). It is the responsibility of the TDLM author to 1) define all the required "card images" for the assembler, 2) assign them to appropriate parcel values so they are generated in the correct position, 3) during exits enter appropriate entries in the dictionary to cause them to be generated, and 4) define the assembler format of the image (see below).

The responsibility of the TDLM author for defining the sequence and location of special card images is similar to the job of generating the linkage convention instruction sequences.

Data Mapping

Data mapping is the function performed by the BCLM of ordering data according to parcel value and then computing the byte offset of each item as it is mapped onto storage. Items are mapped onto storage in such a way that the requested boundary requirements are met (i.e., "holes" are left if necessary to meet boundary requirements). Data are mapped by the Data Map phase just prior to Codegen. This is done so that instruction references to this data can be resolved to an absolute offset value.

The TDLM can specify that spaces be left in storage when data is mapped. This is done in the section definitions using the black hole (?BLAKHOLE) macro. Items are mapped as usual, with spaces skipped as required by the TDLM.

Data specified as parcel 0 are treated uniquely. They are ordered first relative to other parcel values by Data Map, but they are not mapped (offsets calculated) and they are not Datagen'ed when encountered while processing a chain.

Data Formating

Various assemblers have different conventions for the formatting of data items. The locations, ordering and "spelling" of certain things can differ. Also the manner in which boundary alignment and "spacing" is accomplished can differ. The TDLM author must define the formats which can be generated and the selection criteria by which a format is chosen for a dictionary entry. This is done using the ?DATAFORM (formats) and ?ASMDATA (selection criteria) macros (below).

In summary, this general and easily retargetable approach then allows:

Storage classes to be generated in any desired order by mapping to specific section numbers.

Control information related to a storage class can be specified on the section definition and, optionally, precede or follow the data for the storage class.

Data items known to the compiler which should not be generated can be assigned to parcel 0 which is never generated.

Items can be efficiently packed within a storage class by selecting items with similar size characteristics and assigning them to the same parcel values and placing those with different characteristics in different parcel values.

If the machine has instructions which can more efficiently access items in a particular part of storage, this can be controlled by appropriate assignment to parcel values.

Any special control "cards " for an assembler or linkage editor ("funny cards") can be generated if desired in the correct location by appropriate assignment to special parcel numbers.

Unique formatting requirements can be controlled by the assignment to particular section or parcel values.

The approach described has been found to be very adaptable to a number of unique machine and assembler requirements. The retargetable compiler code to support this powerful approach is only a fraction of the size of the "hard coded" approach and the specification for a particular target machine is typically only about 100 lines of easily maintainable macro specification.

Significant Features:

Simple yet very general specification of the data capabilities of a target machine.

Provides ease of retargetability of the compiler data generation to different target machines.

SPECIFYING A RETARGETABLE DATAGEN

To specify the datagen component for the retargetable compiler the "TDLM author" must specify the following information so that the generator can generate the necessary pieces of the TDLM. You may wish to refer to the example and operation sections below to better understand the following description. Each of the macros described below is used to build a table of information, but the description of the operation may, for simplicity, describe the compiler operation with reference to the macros.

The TDLM author must specify how the data within each section of storage is assigned to parcels. This is essentially an ordering of the data based upon the characteristics of the data. The ?SECTION macro defines the start of a section specification and the ?SECTEND macro designates the end. Within a section, the ?PARCEL macro is used to define the data characteristics which cause program data (dictionary entries) to be assigned a particular parcel number. During Dictionary Completion phase the compiler uses the table built from the ?PARCEL macros to assign a parcel number to each dictionary entry. The parcel specifications are searched in the order they were specified so that the specifications can be used to "sieve out" various types of data. Any data added to the dictionary in later phases is also assigned a parcel number in the same manner by the dictionary service routines.

Judicious choices in the ordering of information and assignment of parcel numbers can be used to minimize the number of ?ASMDATA and ?DATAFORM macros described below. This is illustrated in the example.

During the Data Map phase the dictionary is actually sorted in section and parcel number order so that data generation can put the items out in the order desired by the TDLM author. The data map phase also assigns offset values to each dictionary item. The ?BLAKHOLE macro is used by the TDLM author to specify any storage locations which are unavailable for assignment. The ?ASMDATA macros are used at data generation time to determine how each item (except parcel 0 items) from the dictionary is to be formatted. The "sieve" of ?ASMDATA macro statements selects a ?DATAFORM macro to be used to format the dictionary item. The ?DATAFORM macro specifies the actual format of the item.

DATA GENERATION OPERATION

The following provides a description of how the information provided by the TDLM author is used to construct the TDLM datagen information for the target machine and how this information is used during the operation of the retargetable compiler to generate data for the target machine.

Figure 5:
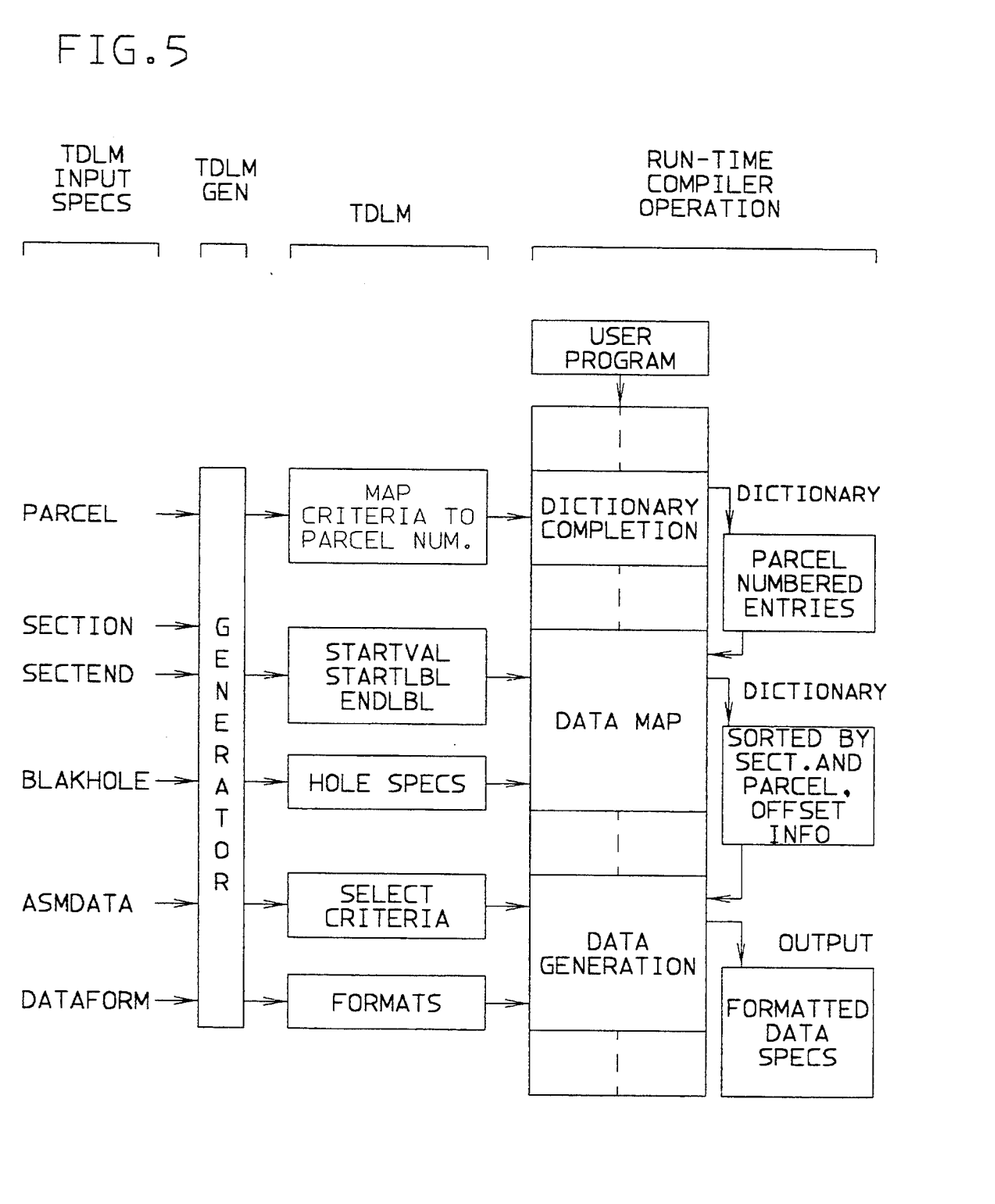
FIG. 5 is a block flow diagram of the operation of a retargetable data generation method in accordance with a preferred embodiment of the present invention.

The source information from the TDLM author is compiled into tables, as shown in FIG. 5, in a straightforward manner. These tables are then used by a number of phases of the compiler to construct the desired output information.

The TDLM is generated once to build the TDLM (Target Dependent Load Module). Thereafter, whenever the compiler is invoked, the TDLM is loaded and linked into the base compiler load module. This provides the base compiler with the access to the target dependent tables needed to generate the data according to the TDLM author's specifications.

The manner in which the data from the TDLM author's specifications is used is outlined in the section describing the TDLM macros.

DATA GENERATION SPECIFICATION EXAMPLE

```
?TDLM000;
?BLAKHOLE SIZE(10) MODULAR(1024);
                /* SKIP 10 BYTES EVERY   */
                /* 1024, START AT 0      */
?SECTION NAME(STATIC);
    ?PARCEL VALUE(41) CAV(A#BIN32) BDY(EQ);
                /* screen out Fixed 32   */
    ?PARCEL VALUE(41) CAV(A#BIT32) BDY(EQ);
                /* screen out Bit   32   */
    ?PARCEL VALUE(42) CAV(A#BIN31) BDY(EQ);
                /* screen out Fixed 31   */
    ?PARCEL VALUE(51) CAV(A#BIN16) BDY(EQ);
                /* screen out Fixed 16   */
    ?PARCEL VALUE(51) CAV(A#BIT16) BDY(EQ);
                /* screen out Bit   16   */
    ?PARCEL VALUE(52) CAV(A#BIN15) BDY(EQ);
                /* screen out Fixed 15   */
    ?PARCEL VALUE(70) DEFAULT;
                /* ANYTHING ELSE LAST    */
?SECTEND;
?SECTION NAME(AUTOMATIC) STARTLBL('@DATA') STARTVAL(100);
    ?PARCEL VALUE(41) CAV(A#BIN32) BDY(EQ);
                /* screen out Fixed 32   */
    ?PARCEL VALUE(41) CAV(A#BIT32) BDY(EQ);
                /* screen out Bit   32   */
    ?PARCEL VALUE(42) CAV(A#BIN31) BDY(EQ);
                /* screen out Fixed 31   */
    ? PARCEL VALUE(51) CAV(A#BIN16) BDY(EQ);
                /* screen out Fixed 16   */
    ?PARCEL VALUE(51) CAV(A#BIT16) BDY(EQ);
                /* screen out Bit   16   */
    ?PARCEL VALUE(52) CAV(A#BIN15) BDY(EQ);
                /* screen out Fixed 15   */
    ?PARCEL VALUE(70) DEFAULT;
                /* ANYTHING ELSE LAST    */
?SECTEND ENDLBL('@ENDDATA');
    ?ASMDATA DATAFORM(STORAGE) PARCEL(41) ARGS('F');
                /* Fixed 32    */
    ?ASMDATA DATAFORM(STORAGE) PARCEL(42) ARGS('F');
                /* Fixed 31    */
    ?ASMDATA DATAFORM(STORAGE) PARCEL(51) ARGS('H');
                /* Fixed 16    */
    ?ASMDATA DATAFORM(STORAGE) PARCEL(52) ARGS('H');
                /* Fixed 15    */
/* "Funny cards" to delimit sections
      to the assembler and pgm end */
    ?ASMDATA DATAFORM(CSECT ) PARCEL(1);
                /* Parcel 1 is CSECT card   */
    ?ASMDATA DATAFORM(SECTION) PARCEL(2);
                /* Name Section begin pt    */
    ?ASMDATA DATAFORM(SECTION) PARCEL(254);
                /* Name Section end point   */
    ?ASMDATA DATAFORM(PGMEND ) PARCEL(255);
                /* End of program "card"    */
```

-continued

DATA GENERATION SPECIFICATION EXAMPLE

```
?DATAFORM NAME(SECTION)
        FIELDS(NAME,TAB(10),'ORG *');
?DATAFORM NAME(CSECT )
        FIELDS(NAME,TAB(10),'CSECT ',BDY);
?DATAFORM NAME(STORAGE)
        FIELDS(NAME,TAB(10),'DS',TAB(16),ARG);
?DATAFORM NAME(PGMEND )
        FIELDS(TAB(10),'END ',NAME, '(',
        CONSNAME(@VERSION), ',',
        CONSNAME(@DATE), ')');
?TDLM0099;
```

DATAGEN MACROS

This section describes in precise detail the use of specific datagen macros and provides limited examples of their use in context. If the detailed use is not of interest to you this section may be skipped and used simply for reference.

'SECTION MACRO'

The SECTION macro defines a section of data.

NAME(<name>)
This is the name of the section (e.g., STATIC, AUTOMATIC).
STARTLBL(<label>)
This provides a place for the TDLM author to define a default section start "label". This can be retrieved by the TDLM exits and its use and interpretation are up to the TDLM exit author. The <label> may be either a quoted char string or variable holding a character string.
STARTVAL(<fx value>)
This value will be used by the data mapping service as the starting value of the Data Generation offset. If none is specified, zero is used. The <fx value> may be either a constant value or variable holding a fixed value.

| 'Examples' |
|---|
| ?SECTION NAME(STATIC); |
| ?SECTION NAME(AUTOMATIC) STARTLBL('@DATA') STARTVAL(100); |

'SECTEND MACRO'

The SECTEND macro defines the end of a section definition. All ?PARCEL macros between a ?SECTION and ?SECTEND apply to that section.

ENDLBL(<label>)
This provides a place for the TDLM author to define a default section end "label". This can be retrieved by the TDLM exits and its use and interpretation are up to the TDLM exit author.

| 'Examples' |
|---|
| ?SECTION NAME(STATIC); |
| ... |
| ?SECTEND; |
| ?SECTION NAME(AUTOMATIC) STARTLBL(@DATA); |
| ... |
| ?SECTEND ENDLBL(@ENDDATA); |

'PARCEL MACRO'

The PARCEL macro specifies the criteria for placing a dictionary item into the specified parcel (given parcel value). The parcel definitions should be thought of as a series of "sieves" which select out items for a particular parcel. Thus, the order of parcel definitions is very important. Every one of the specified conditions must be met ("AND" relationship). "OR" relationships are specified by using multiple PARCEL macros. "NOT" conditions are handled by screening out the undesired relation with a prior PARCEL macro. If a definition appears to select items which are not desired, a prior definition may be required to "screen out" the unwanted items. More than one definition can specify the same parcel value.

VALUE(<fx value>)

This is the number of the parcel by which parcels will be ordered by premap.

CAV(<A# const>)

The A#const values are compiler-defined constants which are used to indicate a specific datatype/precision. This keyword indicates the datatype requirements for items to be in the parcel. The A#-const can be a specific class/element (e.g., A#BIN31—Binary Fixed 31) or an entire class (e.g., A#CHR—any character string item). If no CAV value is specified or A#NULL is specified then there are no datatype restrictions.

PLACE(<fx value>)

This indicates the minimum boundary to which each dictionary item in this parcel will be mapped by premap. The range is >=1 and <=2**31 and it must be a power of two (1, 2, 4, 8 etc. . .). The default value is 1. Use of certain PLACE values may cause bytes to be skipped in storage.

BDY(<relational>)

This is used to specify a relational (EQ, LT, GT, LE, GE, NE). This keyword indicates that the dictionary item must meet the specified boundary relationship with respect to the default boundary for the datatype (e.g., if the bdy of the dictionary item is "word" (4) and the default is halfword (2) then the relationship GE (i.e., 4 GE 2) would be met but the relationship EQ (4 EQ 2) would not be. This keyword can be used to screen out items with high boundary requirements which might cause poor packing of data.

BDYOFF(CONFORM)

This keyword may be used only with BDY relationals EQ, GE or GT. It specifies that the bdy offset of the dictionary item must conform with the default bdy offset. For example, if the default bdy is (4,2) then the bdy/offsets which conform are (4,2), (8,2), (8,6), (16,2), (16,6), (16,10), etc. In other word the remainder of the item boundary divided by the default boundary must equal the default offset.

D#const values are used to indicate any valid data attribute (e.g., STATIC, AUTOMATIC, NONLOCAL, ARRAY, STRUCTURE, etc).

ATTRS(<D# const list>) This keyword specifies a list of attributes which must be met for the item to be placed in the specified parcel.

DEFAULT

This specifies that this VALUE is also the DEFAULT value to be used if none of the parcel specifications are met. It can be specified on any of the specs, but can be specified only once per SECTION.

'Examples'

```
?SECTION NAME(AUTOMATIC) STARTLBL(@DATA);
?PARCEL VALUE(70) ATTRS(D#STRC);
            /* SCREEN OUT STRUCTURES  */
?PARCEL VALUE(80) ATTRS(D#DIM );
            /* SCREEN OUT ARRAYS      */
?PARCEL VALUE(90) BDY(GT);
            /* SCREEN OUT LARGE BDYS  */
?PARCEL VALUE(30) CAV(A#FXBIN);
            /* ARITHMETICS FIRST      */
?PARCEL VALUE(40) DEFAULT;
            /* ANYTHING ELSE SECOND   */
?SECTEND ENDLBL(@ENDDATA);
```

'BLAKHOLE MACRO'

The BLAKHOLE macro specifies the criteria for skipping spaces in storage. It defines the areas to be skipped and how often they occur. Data items will then be mapped around these holes.

```
?—BLAKHOLE——SIZE(value)————┐
                           │
      ┌────────────────────┘
      │
      └—MODULAR(repeats,starts)—;
```

EXAMPLE
FO OFF

```
?SECTION NAME(AUTOMATIC) STARTLBL(@DATA);
?BLAKHOLE SIZE(16) MODULAR(2048,10);
?BLAKHOLE SIZE(10) MODULAR(1024);
          /* STARTS DEFAULTS TO 0  */
?BLAKHOLE SIZE(5)  MODULAR(2048);
          /* STARTS DEFAULTS TO 0  */
?SECTEND ENDLBL(@ENDDATA);
```

'THE ASMDATA MACRO'

The ASMDATA (assembler data) macro specifies the criteria for selecting a specific data format and the arguments (if any) passed to it.

DATAFORM(<name>)
  This is the name of the format (unquoted). It can be any unique name from 1 to 8 characters. It must match a format name in a DATAFORM macro.
ARGS
  This defines the arguments passed to the format.
PARCEL(<fx value>)
  The item must have the specified parcel value in order to be selected by this macro.
BDY(<fx value>)
  The item must have the specified boundary value in order to be selected by this macro.
BDYOFF(<fx value>)
  The item must have the specified boundary offset value in order to be selected by this macro.
ATTRS(<D#value>)
  The item must have the specified attributes in order to be selected by this macro.
CAV(<A#value>)
  The item must have the specified composite attribute value in order to be selected by this macro.
DNAME(<dname>)
  The item must have the specified dictionary name in order to be selected by this macro.

'Examples'

?ASMDATA DATAFORM(STORAGE)
              CAV(A#BIN31) ARGS('F');
?ASMDATA DATAFORM(STORAGE)
              CAV(A#BIN32) ARGS('F');
?ASMDATA DATAFORM(STORAGE)
              CAV(A#BIN15) ARGS('H');
?ASMDATA DATAFORM(STORAGE)
              CAV(A#PTR32) ARGS('A')

-continued

'Examples'

?ASMDATA DATAFORM(CSECT   ) PARCEL(1);
?ASMDATA DATAFORM(SECTION) PARCEL(2);
?ASMDATA DATAFORM(SECTION) PARCEL(254);
?ASMDATA DATAFORM(PGMEND  ) PARCEL(255);

'THE DATAFORM MACRO'

The DATAFORM (data format) macro specifies the format of data for the assemble.

NAME( <name>)
  This is the name of the format (unquoted). It can be any unique name from 1 to 8 characters.
FIELDS
  This defines the fields of the format.
ARG or ARG(<fx value>) —Keyword indicates that the content of this field is specified by an argument from the ?ASMDATA macro which caused this format to be selected.

'Examples'

?DATAFORM NAME(SECTION)
              FIELDS(NAME,TAB(10),'ORG *');
?DATAFORM NAME(CSECT   )

-continued

'Examples'

```
        FIELDS(NAME,TAB(10),'CSECT ',',BDY);
?DATAFORM NAME(STORAGE)
        FIELDS(NAME,TAB(10),'DS',TAB(16),ARG);
?DATAFORM NAME(PGMEND )
        FIELDS(TAB(10),'END ',NAME, '(' ,
        CONSNAME(@VERSION), ',' ,
        CONSNAME(DATE), ')' );
```

'THE TDLM0000 STATEMENT'

The TDLM0000 statement appears exactly once and must be the first statement coded in the Datagen TDLM definition. It replaces a normal PL/S PROC statement. It has the form:

```
?—name:—TDLM0000—DATAGEN—┐
                         │
                         │
        └─LEVEL—(—level-characters—)—;
``` name
This is the name of the Datagen module. It is pointed to by the NAME keyword on a LOADLIST macro which has "PHASE(DATAGEN)" coded.
DATAGEN
This keyword is coded to indicate that Datagen is being defined. Other TDLM modules will also use the TDLM0000 statement but with different keywords provided.
LEVEL (level characters) p1 The level of this expression transformation module is defined by the author of the TDLM. It is a character string of one to eight characters.

EXAMPLE

? IRLUC1J: TDLM0000 DATAGEN LEVEL(00001.00);

'THE TDLM0099 STATEMENT'

This is coded once. It replaces the "END;" statement which normally terminates a PL/S program. The statement has the following form:

?—TDLM0099———;

Thus, while the invention has been described with reference to preferred embodiments thereof, it will be understood by those skilled in the art that various changes in form and details may be made without departing from the scope of the invention.

What is claimed is:

1. A computer implemented method of compiling a source language program having a plurality of source program statements to generate intermediate language code in a format required by one of a plurality of data processing systems, wherein said intermediate language code comprises a plurality of procedure specification statements and a plurality of data specification statements, wherein each of said plurality of data processing systems has unique intermediate language code formatting requirements, and wherein said plurality of source program statements include procedural source program statements defining procedural steps and data object source program statements that define a plurality of data objects each having a storage class and a set of data attributes associated therewith, said method comprising the steps of:
   (a) in advance of compilation, in response to user input:
      (1) selecting a target system from said plurality of data processing systems;
      (2) storing a first classification table associating one of a plurality of first classification identifier values with each of said data object storage classes;
      (3) storing a second classification table for each of said storage classes associating one of a plurality of second classification identifier values with each of said sets of data object data attributes; and
      (4) associating a unique intermediate language data code format with said target system for each of a plurality of combinations of first and second classification identifier values; and
   (b) at compilation time, automatically:
      (1) assigning each of said data objects the first classification identifier value associated in said first classification table with the storage class of said data object;
      (2) assigning each of said data objects the second classification identifier value associated in said second classification table for the storage class of said data object with the data attributes of said data object;
      (3) ordering said data objects by said first and second classification identifier values;
      (4) transforming said procedural source program statements into intermediate language procedural code;
      (5) transforming said ordered data objects into intermediate language data code having said unique intermediate language data code format by performing the following steps for each one of said ordered data objects:
         (A) testing to determine whether or not one of said unique intermediate language data code formats exists for said first and second classification identifier values for said one of said ordered data objects;
         (B) if one of said unique intermediate data code formats does not exist, generating an error message; and
         (C) if one of said unique intermediate data code formats exists, generating intermediate language data code from said one of said ordered data objects using said unique intermediate language data code format; and
      (6) combining said intermediate language procedural code with said intermediate language data code to form said intermediate language code.

2. A computer implemented method of constructing a compiler program to transform source language code into intermediate program code for a selected one of a plurality of target data processing systems, wherein said compiler program performs target system specific functions and base compiler functions, wherein each of said plurality of target systems requires a different intermediate program code format, and wherein said source language code defines data objects and procedural statements, the method comprising the steps of:
   (a) accepting user input:
      (1) specifying a program code load module implementing said base compiler functions;

(2) specifying for each of said target systems:
: (A) first classification criteria for grouping data objects into a set of first classes;
: (B) second classification criteria for grouping data objects into a set of second classes within said first classes; and
: (C) a data definition output format associated with one or more combinations of each of said first and second classes;

(b) in response to said user input, generating for each of said target systems:
: (1) a table containing said first and second classification criteria and data definition output format associated with said first and second classification criteria in a form required to support said target system specific functions; and
: (2) an executable load module by compiling data definition instructions and said table into said executable load module;

(c) selecting one of said executable load modules corresponding to a selected target system; and (d) joining said program code load module representing said base compiler functions and said selected executable load module to form said compiler program.

3. A computer implemented method for compiling a program expressed as a plurality of source statements to generate target system specific procedural code and target system specific data definition code for use with one of a plurality of target data processing systems, wherein said source statements include procedural statements and data objects having attributes and each of said plurality of target data processing systems requires a unique form of procedural and data definition code, said method comprising the steps of:

(a) in advance of compilation, in response to user input:
: (1) selecting a target system from said plurality of data processing systems for which compiling is to be performed;
: (2) storing operator supplied data classification criteria associated with said target data processing systems, said data classification criteria defining a plurality of data object groups based on said attributes wherein each of said data object groups is assigned a group data classification; and
: (3) storing an operator supplied target system specific data definition output format for each of the plurality of group classifications; and (b) at compilation time, automatically:
: (1) assigning a group data classification to each of said data objects by:
:: (A) determining the data object group defined for the attributes of the data object by said data classification criteria; and
:: (B) assigning to said data object the group data classification assigned to that data object group in accordance with said classification criteria;
: (2) ordering said data objects by said assigned group data classification;
: (3) generating said target system specific procedural code from said procedural statements; and
: (4) generating said target system specific data definition code for each of said ordered data objects using the target system specific data definition output format stored for the group data classification of said ordered data object.

4. A computer implemented method of compiling a source language program having a plurality of source program statements to generate intermediate language code in a format required by a selected target data processing system, wherein said intermediate language code comprises a plurality of data specification statements, and wherein said plurality of source program statements include data object source program statements that define a plurality of data objects each having a storage class and a set of data attributes associated therewith, said method comprising the steps of:

(a) in advance of compilation, in response to user input:
: (1) storing a first classification table associating one of a plurality of first classification identifier values with each of said data object storage classes;
: (2) storing a second classification table associating one of a plurality of second classification identifier values with each of said sets of data object data attributes for each of said storage classes; and
: (3) associating a unique intermediate language data code format for said selected target system with each of a plurality of combinations of first and second classification identifier values; and (b) at compilation time, automatically:
: (1) assigning each of said data objects the first classification identifier value associated in said first classification table with the storage class of said data object;
: (2) assigning each of said data objects the second classification identifier value associated in said second classification table for the storage class of said data object with the data attributes of said data object;
: (3) ordering said data objects by said first and second classification identifier values; and
: (4) transforming said ordered data objects into intermediate language data code having said unique intermediate language data code format by performing the following steps for each one of said ordered data objects:
:: (A) testing to determine whether or not one of said unique intermediate language data code formats exists for said first and second classification identifier values for said each one of said ordered data objects; and
:: (B) if one of said unique intermediate data code formats exists, generating intermediate language data code from said each one of said ordered data objects using said unique intermediate language data code format.

5. The method of claim 4, further comprising the steps of:
creating a data dictionary containing an entry for each of said plurality of data objects, wherein said entry contains said storage class, said data attributes, and said first and second classification identifier values for each of said data objects;
and wherein said ordering step comprises the step of:
ordering said data dictionary by said first and second classification identifier values.

6. A computer implemented method for compiling a program expressed as a plurality of source statements to generate target specific data definition code for use with a selected one of a plurality of target data processing systems, said source statements including data objects having attributes, said method comprising the steps of:

(a) in advance of compilation, in response to user input:
  (1) storing operator supplied data classification criteria associated with said target data processing systems, said data classification criteria defining a plurality of data object groups based on said attributes wherein each of said data object groups is assigned a group data classification; and
  (2) storing an operator supplied target specific data definition output format for each of the plurality of group classifications; and (b) at compilation time, automatically:
  (1) assigning a group data classification to each of said data objects by:
    (A) determining the data object group defined for the attributes of the data object by said data classification criteria; and
    (B) assigning to said data object the group data classification assigned to that data object group in accordance with said classification criteria;
  (2) ordering said data objects by the assigned group data classification; and
  (3) generating said target specific data definition code for each of the ordered data objects using the target specific data output format stored for the group data classification of the ordered data object.

7. The method according to claim 6 wherein said step of assigning a group data classification to said data objects assigns a group data classification having a data object section and a data object parcel by performing the steps of:
  determining said data object section based on data object storage and addressability characteristics; and
  determining a data object parcel based on data object type and data output formats required for said target system.

8. The method according to claim 6 wherein the step of ordering said data objects by data classification comprises the steps of:
  building a dictionary of said data objects;
  modifying said dictionary in accordance with said data classification criteria; and
  ordering said dictionary by said data classification.

* * * * *